(12) United States Patent
Babagbeto et al.

(10) Patent No.: US 8,576,856 B2
(45) Date of Patent: Nov. 5, 2013

(54) IP TELEPHONY SERVICE INTEROPERABILITY

(75) Inventors: Patrick Babagbeto, Trebeurden (FR);
Marc Bailly, Pleumeur Bodou (FR);
Jean-François Jestin, Lannion (FR)

(73) Assignee: France Telecom, Paris (FR)

( * ) Notice: Subject to any disclaimer, the term of this patent is extended or adjusted under 35 U.S.C. 154(b) by 1087 days.

(21) Appl. No.: 12/087,151

(22) PCT Filed: Dec. 22, 2006

(86) PCT No.: PCT/FR2006/002865
§ 371 (c)(1),
(2), (4) Date: Jun. 27, 2008

(87) PCT Pub. No.: WO2007/074236
PCT Pub. Date: Jul. 5, 2007

(65) Prior Publication Data
US 2009/0022144 A1    Jan. 22, 2009

(30) Foreign Application Priority Data
Dec. 27, 2005  (FR) ..................................... 05 13373

(51) Int. Cl.
*H04L 12/28* (2006.01)
(52) U.S. Cl.
USPC ........................................................ 370/401
(58) Field of Classification Search
None
See application file for complete search history.

(56) References Cited

U.S. PATENT DOCUMENTS

| | | | |
|---|---|---|---|
| 6,282,192 B1 | 8/2001 | Murphy et al. | |
| 6,772,210 B1* | 8/2004 | Edholm | 709/226 |
| 7,394,818 B1* | 7/2008 | Johnson et al. | 370/401 |
| 2002/0021465 A1 | 2/2002 | Moore et al. | |
| 2002/0150080 A1* | 10/2002 | Bhattacharya et al. | 370/351 |
| 2003/0048775 A1* | 3/2003 | Westermeier | 370/352 |
| 2003/0095539 A1* | 5/2003 | Feuer | 370/352 |
| 2003/0115335 A1 | 6/2003 | Yoshida | |
| 2005/0122963 A1 | 6/2005 | Jeon | |

FOREIGN PATENT DOCUMENTS

| | | |
|---|---|---|
| EP | 1 505 774 | 2/2005 |
| WO | WO 0156233 | 2/2001 |

OTHER PUBLICATIONS

Pavlin Dobrev et al: "Device and Service Discovery in Home Networks with OSGI" IEEE Communications Magazine, IEEE Service Center, Piscataway, US, vol. 40, No. 8, Aug. 2002, pp. 86-92, XP011092902; ISSN: 0163-6804 p. 86, right-hand column, line 15—p. 87, left-hand column, line 4 p. 88, left-hand column, line 1—p. 90, left-hand column, line 27; figures 2-4.

* cited by examiner

*Primary Examiner* — Ming-Trang Nguyen
(74) *Attorney, Agent, or Firm* — Knobbe Martens Olson & Bear LLP

(57) ABSTRACT

The invention concerns a residential gateway device designed for a decentralized client equipment and comprising converting means for providing interoperability between to separate IP telephony services.

6 Claims, 4 Drawing Sheets

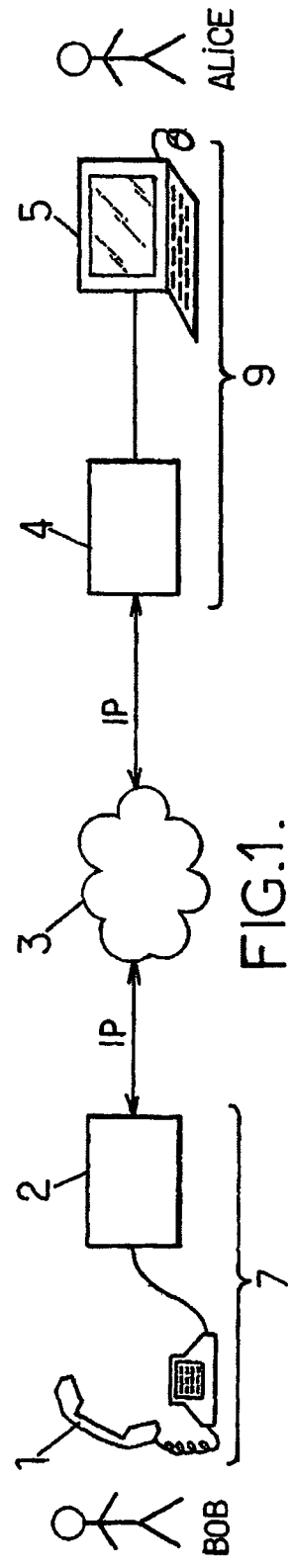
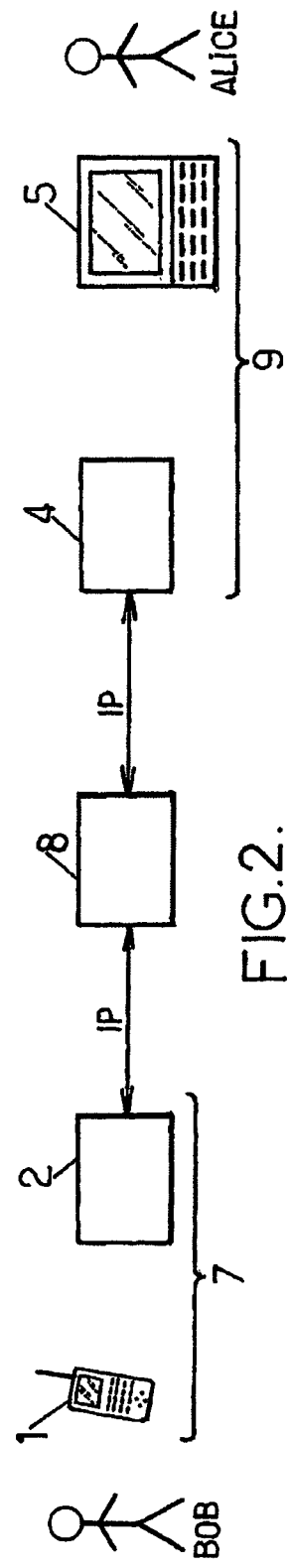
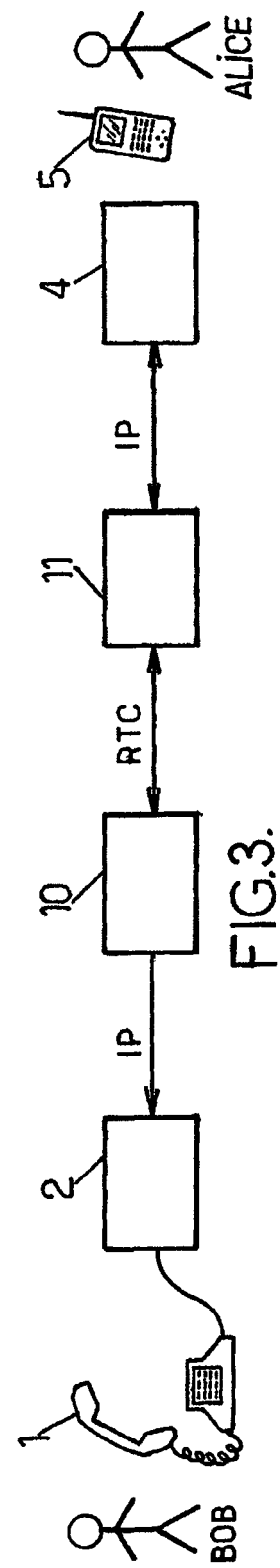

IP TELEPHONY SERVICE INTEROPERABILITY

This application claims priority from PCT/FR2006/002865 filed Dec. 22, 2006, which claims priority from French Application FR 05 13373, filed Dec. 27, 2005, both of which are hereby incorporated by reference in their entirety.

BACKGROUND OF THE INVENTION

The present invention relates to IP (Internet Protocol) telephony services.

The present invention therefore has applications in the field of voice on IP, but also in other fields, such as Internet videoconferencing.

IP telephony, sometimes called Internet telephony, and often abbreviated as "VoIP" (Voice over IP), is a technique which makes it possible to communicate via the Internet network, or any other network accepting the TCP/IP protocol. Unlike STN (switched telephone network) or RTC (from the French "Réseau téléphonique Commuté") depending on dedicated telephone exchanges, IP telephony allows the transport of telephone conversations over the whole of the digital or analog network accepting the TCP/IP protocol, for example Ethernet, ISDN (Integrated Services Digital Network) or RNIS (from the French "Réseau Numérique à Intégration de Services"), PPP (Point-to Point Protocol), etc.

A user of a given IP telephony service has client equipment, for example domestic equipment, configured for this IP telephony service. The client equipment typically comprises a terminal to provide a user interface. The client equipment also comprises a home gateway to provide the interface with the IP network in accordance with the given IP telephony service.

"Home Gateway" is understood to mean a client gateway, that is to say a gateway located at the user end, unlike a network equipment situated in the network under the control of an operator. It may for example be a gateway for domestic use within a home, or it may be a gateway for professional use within a business. In general, it is a gateway for client use.

The user of an IP telephony service may converse with any other user of the same IP telephony service, that is to say with any other user having a client equipment configured for that IP telephony service.

FIG. 1 shows an example of communication between users of a same IP telephony service.

Two users, Bob and Alice, of this IP telephony service have equipments 7 and 9 respectively, each comprising a terminal 1, 5, connected to a home gateway 2, 4. The gateways 2, 4 provide an interface between the terminals 1, 5 and the internet 3.

The terminals 1, 5 may be of various types, for example a conventional fixed telephone, a mobile telephone, personal digital assistant, a computer provided with an IP telephony service, etc.

There are however various IP telephony services, possibly offered by different operators.

A user of a first IP telephony service, referred to as the caller, may wish to converse with a user of a second IP telephony service, distinct from the first service, referred to as the recipient.

The caller may then, for example, configure his client equipment so that he may himself become a user of the second IP telephony service.

According to another possibility, the communication between the two users Bob and Alice may be carried out via a centralized gateway 8 installed between the networks of the two IP telephony service providers, as shown in FIG. 2.

In this example, the data exchanged between Bob and Alice pass through the centralized interconnection gateway 8, which makes it possible to convert the data transmitted by Bob in accordance with one of the two IP telephony services into data in accordance with the other IP telephony service, and vice-versa.

The centralized interconnection gateway 8 is managed by the operators of the two IP telephony services, and may cover a relatively wide geographic area, comprising for example a whole country.

According to a third possibility and insofar as the recipient has an E164 number (commonly called a "telephone number"), data may be exchanged by means of two transits, as shown in FIG. 3.

The data exchanged pass through two centralized interconnection gateways 10, 11.

The data sent by the caller Bob flows in the IP network as far as the gateway 10. It is then converted into data in accordance with a format adapted to STN before arriving at the gateway 11. The data then undergoes a second conversion in order to flow on the IP network as far as the recipient Alice. In the other direction, the data sent by Alice is first converted by the gateway 11 and then by the gateway 10.

The gateways 10, 11 are managed in a centralized manner, and may cover a relatively wide geographic area, comprising for example several countries.

Furthermore, the possibility of communication shown in FIG. 3 may only be envisaged insofar as Alice has an E164 number.

SUMMARY OF THE INVENTION

A purpose of the present invention is to make communications between two users of distinct IP telephony services more flexible and easier to manage.

According to a first aspect, the present invention relates to a home gateway device intended for a decentralized client equipment and comprising data conversion means for providing interoperability between two distinct IP telephony services.

Such a device allows a decentralized conversion of data exchanged between users of two distinct IP telephony services.

Thus, a user of a service wishing to converse with a user of another service does not need to configure his client equipment in order to himself become a user of that other service as in the prior art.

Moreover, by having several home gateways according to the first aspect of the invention, it is possible to avoid the installation and maintenance of a centralized interconnection gateway dedicated to interoperability between these two IP telephony services. The communications between users of two distinct IP telephony services are thus easier to manage for the operators.

Furthermore, in the prior art, the data exchanged are likely to transit on the switched telephone network (STN). Home gateways according to the first aspect of the invention make it possible to avoid such a transit on a paid network. The communications may thus remain cheap even between users of two distinct IP telephony services.

Moreover, communication between users of different services may be possible even when the recipient does not have an E164 number.

Advantageously, a network address is allocated to the home gateway device. The home gateway device also comprises receiving means for receiving a request for at least one address of a gateway device able to convert data in order to provide interoperability between two given distinct IP telephony services, and means of sending a response to the request, said response comprising the network address allocated to the home gateway device.

Thus, it is possible to search in a network for which home gateway is able to provide interoperability between the two IP telephony services. Only a relatively small number of home gateways according to the first aspect of the invention may thus be installed in the network. The installation of communication support devices between users of two distinct IP telephony services is thus relatively simple.

The present invention is not of course limited to such a routing method. For example, the home gateway of each user of a service may be arranged to make it possible to achieve interoperability between said service and another service. When a user of said service wishes to converse with a user of the other service, interoperability is achieved in situ by the caller's home gateway. No search for a gateway able to achieve interoperability is necessary. Similarly, when a user of the other service wishes to converse with a user of said service, interoperability may be achieved by the latter's home gateway, that is to say the recipient's home gateway.

According to a second aspect, the present invention relates to an interoperability method intended to be used by a first home gateway device of a client equipment, comprising the following steps:

receiving from a second home gateway device data sent in accordance with a first IP telephony service, and receiving from a third home gateway device data sent in accordance with a second IP telephony service, converting the data received from the second home gateway device into data in accordance with the second IP telephony service, and converting the data received from the third home gateway device into data in accordance with the first IP telephony service, and transmitting the data converted in accordance with the second IP telephony service to the third home gateway device, and transmitting the data converted in accordance with the first IP telephony service to the second home gateway device.

This method makes it possible to achieve interoperability between IP telephony services in a decentralized manner.

Advantageously, this method further comprises the preliminary steps consisting in:

receiving a request for at least one address of a gateway device able to convert data in order to provide interoperability between the first and second IP telephony services, and sending a response, said response comprising an address of the first home gateway device.

Thus, it is possible to search in a network for which device comprises conversion means for providing interoperability between the two IP telephony services.

Alternatively, no search in the network is carried out. The home gateway device implementing the steps of the method according to the second aspect of the invention may be associated with a given user.

Advantageously, the request is received from the second home gateway device. The latter itself carries out the search for home gateways able to provide interoperability.

Alternatively, the request may be received from a server device. The second home gateway device sends, for example, to the server an address of the recipient. The server searches in the network for which home gateway is able to provide the interconnection and returns one or more results to the second home gateway device.

The server device may cover a more or less extended region. It only carries out a search for addresses of home gateways able to achieve interoperability. The server may therefore be less powerful than the centralized interconnection gateways of the prior art and therefore easier to install and to maintain.

According to a third aspect, the present invention relates to a routing method for IP telephony services, comprising:

sending a request for at least one address of a gateway device able to convert data for providing interoperability between two given distinct IP telephony services, and receiving a group of responses comprising at least one response, said at least one response comprising an address of a home gateway device of a decentralized client equipment.

This method may for example be implemented by a home gateway of the caller, or again by a server.

Advantageously, and in particular when the routing method is used by a server, the routing method may comprise, prior to the sending step, a step of receiving from the second home gateway device a request for at least one address of a gateway device able to convert data in order to provide interoperability between two given distinct IP telephony services. The routing method then also comprises a step of sending at least one of the addresses contained in the group of responses to the second home gateway device.

Advantageously, the routing method according to the third aspect of the invention also comprises a step consisting in choosing a single address from among the responses of the group of responses received. Thus, the chosen address may be sent to the second home gateway device.

Alternatively, the server may transmit to the caller's home gateway device all of the addresses of the group of responses. The choice of the address to which the data to be exchanged will be sent is then made by the caller's home gateway device, or by a third party device.

The request may for example be sent to a plurality of home gateway devices, in which case the group of responses comes from said home gateway devices.

The request may alternatively be sent to an indexing server, storing interoperability parameters. The indexing server is able to provide information regarding the home gateway devices able to provide interoperability.

According to a fourth aspect, the invention relates to a routing device for IP telephony services comprising sending means for sending a request for at least one address of a home gateway device able to convert data in order to provide interoperability between two given distinct IP telephony services, and receiving means for receiving a response, said response comprising an address of a home gateway device.

The routing device according to the fourth aspect of the invention makes it possible to search for home gateways in order to achieve interoperability in a decentralized way.

The routing device may for example comprise a server, in indexing server and/or a caller's home gateway. The present invention is not limited by the form of the routing device.

Advantageously, sending means, for example a caller's home gateway device, make it possible to transmit data according to a first IP telephony service to a home gateway device, whose address is contained in the received group of responses, and receiving means, for example the caller's home gateway device, make it possible to receive data in accordance with said first IP telephony service from said home gateway device.

The data according to the first service thus pass through a home gateway "found" by the routing device.

Alternatively, the routing device may not comprise a home gateway. The routing device then offers to the caller's gateway one or more addresses of gateways able to provide interoperability. The caller's gateway transmits data to this address or, if applicable, to one of those addresses.

Advantageously, receiving means, for example a server device, make it possible to receive a request for at least one address of a gateway device able to convert data in order to provide interoperability between two given distinct IP telephony services, said request being received from a home gateway device. Sending means, for example also the server device, make it possible to send at least one address to this home gateway device.

Advantageously, the routing device also comprises an indexing server for storing parameters concerning the interoperability capability of a plurality of home gateway devices. The indexing server makes it possible to avoid interrogating a plurality of home gateway devices one by one.

The term "home gateway device" is equally understood to mean a home gateway (or client gateway) or any client device, or even a device connected to a relatively small number of client equipments. The present invention is distinguished from the prior art at least in that the interoperability between two IP telephony services is achieved in a decentralized manner.

The term "data conversion" is also understood to mean data processing, for example transcoding or adaptation of one protocol to another, or a simple retransmission of data with adaptation of the signaling or of the message headers. The present invention is not therefore limited by the form of the conversion, provided that it allows the passage of data from one of the two services to the other service, and vice-versa if required.

Other features and advantages of the present invention will appear in the following description.

BRIEF DESCRIPTION OF THE DRAWINGS

FIG. 1, already commented upon, shows an example of communication between users of a same IP telephony service, known in the prior art.

FIG. 2, already commented upon, shows an example of communication between users of two IP telephony services via a centralized interconnection gateway, known in the prior art.

FIG. 3, already commented upon, shows an example of communication between users of two IP telephony services via two centralized interconnection gateways, known in the prior art.

DESCRIPTION OF PREFERRED EMBODIMENTS

Identical references are used for identical or similar objects.

Figure 4:
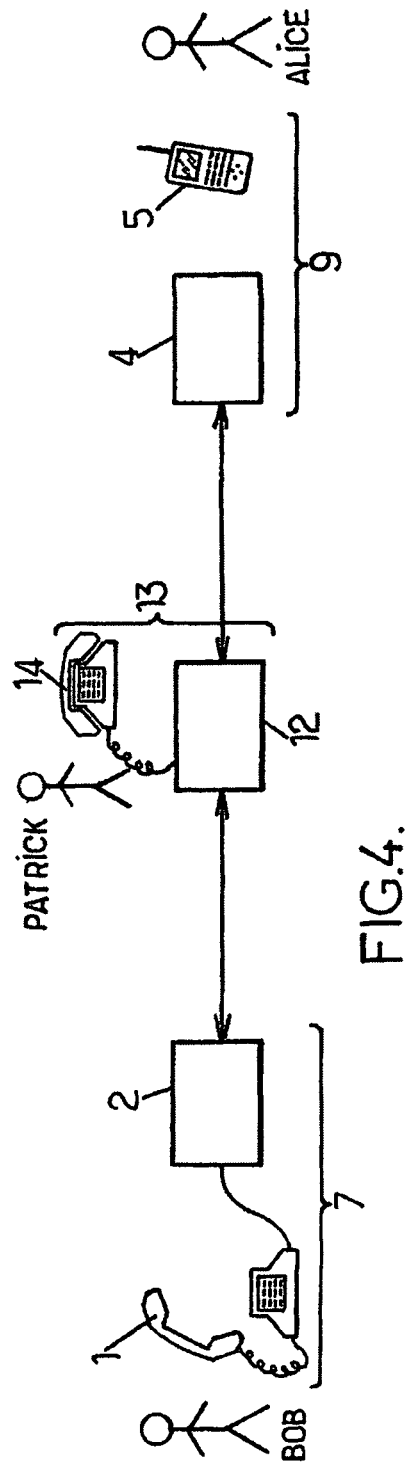
FIG. 4 is a block diagram of an example of communication via a first client equipment between a second client equipment and a third client equipment, according to one embodiment of the invention.

FIG. 4 is a block diagram of an example of communication according to one embodiment of the invention.

A first user, Bob, of a first IP telephony service, referred to as the caller, wishes to converse with a second user, Alice, of a second IP telephony service, distinct from the first IP telephony service, referred to as the recipient. Bob and Alice respectively have client equipments, in this case home equipments 7, 9 each comprising a terminal 1, 5 and a home gateway device 2, 4.

The communication is carried out via a first home gateway device 12 of a first client equipment 13. The client equipment 13 belongs to a third party user, Patrick. The client equipment 13 comprises a terminal 14 and the gateway 12.

The gateway 12 comprises data conversion means (not shown in FIG. 4) for providing interoperability between the two IP telephony services, the operation of which is described below.

During operation, the gateway 12 receives from the gateway 2 of the caller Bob, also called the second home gateway device 2, data transmitted in accordance with the first IP telephony service. Using conversion means, the gateway 12 converts this data into data in accordance with the second IP telephony service and then transmits it to the gateway 4 of the recipient Alice, also called the third home gateway device 4.

In the same way, Patrick's home gateway 12 may receive from Alice's gateway 4 data in accordance with the second IP telephony service. This data is converted into data in accordance with the first IP telephony service and is transmitted to Bob's gateway 2.

Interoperability between the first and second IP telephony services is thus achieved through Patrick's gateway 12.

Figure 5:
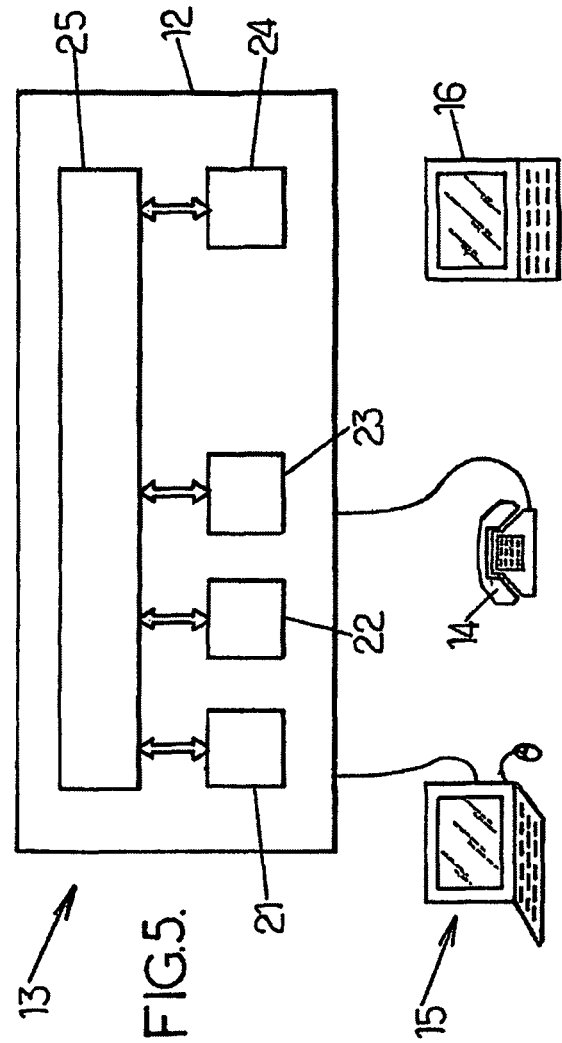
FIG. 5 is a block diagram of an example of client equipment according to one embodiment of the invention.

FIG. 5 is a block diagram of an example of client equipment of the third party, Patrick, according to one embodiment of the invention.

The client equipment 13 comprises a home gateway 12 and terminals 14, 15, 16. The terminals may for example comprise a fixed telephone 14, a computer 15 and a personal digital assistant (PDA) 16. On the computer 15 there may for example be installed two service accounts corresponding to first and second distinct IP telephony services. The fixed telephone 14 makes it possible to provide a user interface for a third IP telephony service and the personal digital assistant 16 makes it possible to provide a user interface for a fourth IP telephony service.

The home gateway 12 comprises conversion means comprising a programming interface (or API—"Application Programming Interface") 21, 22, 23, 24 for each IP telephony service and an interoperability software layer 25. The programming interfaces 21, 22, 23, 24 comprise software stacks of the IP telephony services for which the home gateway 12 hosts an interoperability function.

Interoperability may be achieved by the interoperability software layer 25.

Figure 6:
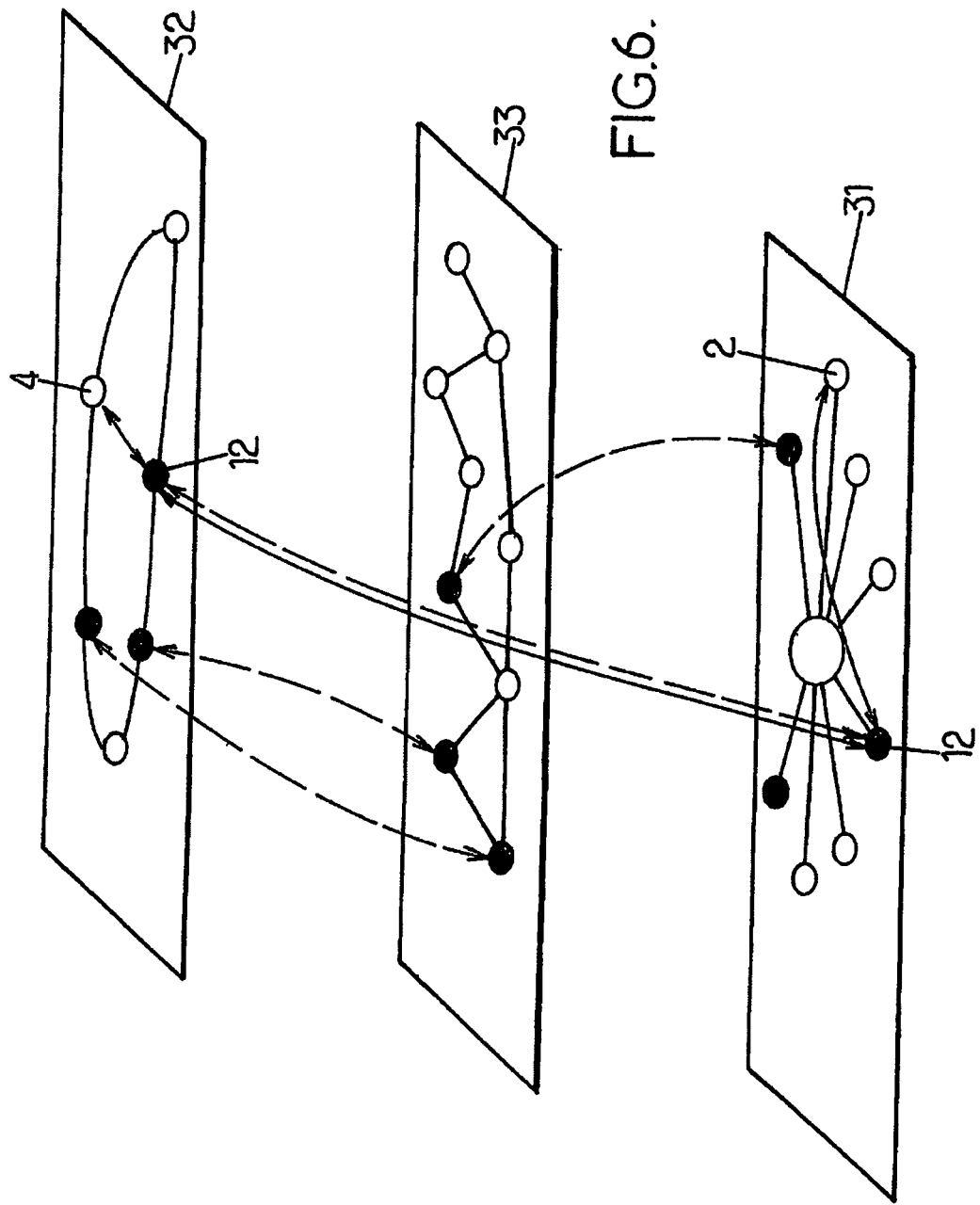
FIG. 6 is a diagrammatic representation of an example of a network comprising a client equipment according to one embodiment of the invention.

FIG. 6 is a diagrammatic representation of an example of a network comprising a client equipment according to one embodiment of the invention.

This network is shown in layers, each layer corresponding to a service. The spots on a first layer 31 represent the home gateways of users having subscribed to the first IP telephony service. The spots on the second layer 32 represent the home gateways of users having subscribed to the second IP telephony service. Finally, the spots on the third layer 33 represent the home gateways of users having subscribed to a third IP telephony service.

The spots remaining white represent home gateways of users having subscribed to a single IP telephony service.

On the other hand, the black spots represent home gateways of users having subscribed to several IP telephony services. These home gateways may be arranged to provide interoperability between IP telephony services.

For example, the gateway 12 belongs both to the first layer 31 and to the third layer 32. This gateway 12 may be arranged in such a way as to provide interoperability between the corresponding services, namely the first service and the second service. The arrows shown in dotted lines indicate a change of network.

Each IP telephony service has its own logical architecture organization. The first service has, for example, a centralized architecture, the second service uses a Distributed Hash Table (DHT) and the third service has a P2P (Peer to Peer) architecture.

Figure 8:
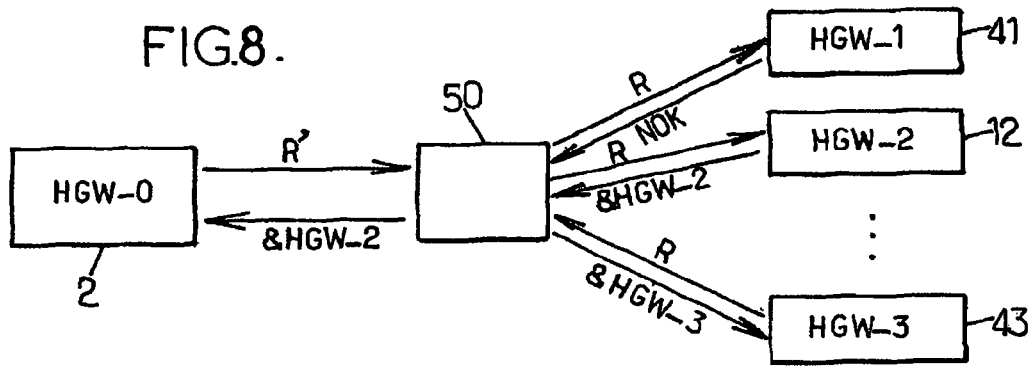
FIG. 8 shows an example of a routing device according to another embodiment of the invention.
Figure 9:
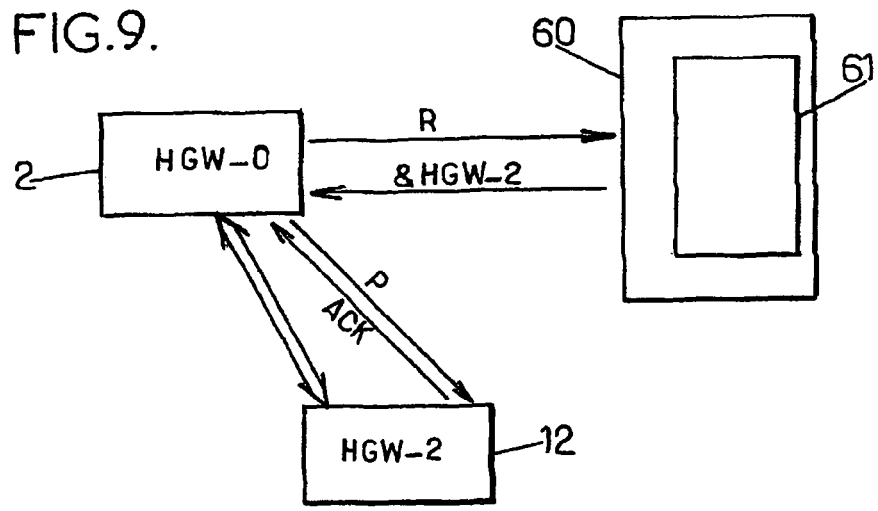
FIG. 9 shows an example of a routing device according to yet another embodiment of the invention.

When a user of the first IP telephony service, having the home gateway 2, wishes to communicate with a user of the second IP telephony service, one or more intermediate home gateways offering interoperability between several services may be called upon. In particular, the gateway 2 may search for the home gateways belonging both to the first layer 31 and to the second layer 32. Examples of different ways of carrying out such a search, also called routing, are shown in FIGS. 7, 8 and 9.

Once the routing is completed, the gateway 2 sends to a chosen home gateway, for example gateway 12, data in accordance with the first service. Gateway 12 converts this data into data in accordance with the second service and transmits it to the recipient's gateway 4. In the reverse direction, gateway 12 converts the data received from the recipient's gateway 4 into data in accordance with the first service and transmits it to the caller's home gateway 2. The arrows drawn in continuous line represent the path followed by the exchanged data.

Figure 7:
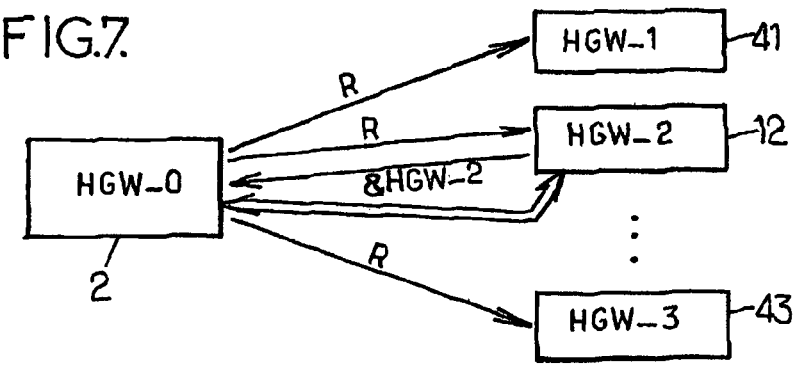
FIG. 7 is a block diagram of an example of a routing device according to one embodiment of the invention.

FIG. 7 is a block diagram of an example of a routing device according to one embodiment of the invention.

In this embodiment, the routing device 2 comprises only one home gateway 2 of a user (not shown in FIG. 7) of a first IP telephony service.

When that user, referred to as the caller, wishes to converse with a user, referred to as the recipient, of another IP telephony service, the gateway 2 sends to a plurality of home gateways 41, 12, 43 a request R for at least one address of a home gateway able to provide interoperability between the two IP telephony services. The plurality of home gateways 41, 12, 43 comprise for example a predefined number of home gateways using the first IP telephony service.

In this example, the home gateways 41, 43 incapable of providing interoperability abstain from responding. Gateway 12 responds by sending its address & HGW_2 to gateway 2.

Gateway 2 possibly chooses one of the home gateways from among those having sent their address, on the basis of appropriate criteria, for example distance or the congestion on the network.

Gateway 2 then sends data in accordance with the first IP telephony service to the chosen gateway, in this case home gateway 12. This data comprises data for opening an IP telephony session as well as actual information data. Gateway 2 also receives data from gateway 12. The exchanged data is represented by a double arrow.

FIG. 8 is a block diagram of an example of a routing device according to another embodiment of the invention.

In this other embodiment, the request R is sent to the plurality of home gateways 41, 12, 43 by a server device 50 in communication with the home gateway 2.

The server device 50 acts on the request R' from gateway 2.

The server device 50 may possibly receive a set of responses comprising several responses, for example a negative response NOK and two addresses & HGW_2, & HGW_3. The server device 50 chooses an address from among the received addresses and sends it to the home gateway 2. It is to the home gateway 12 corresponding to that address that the home gateway 2 subsequently sends data in accordance with the first IP telephony service (not shown).

FIG. 9 is a block diagram of an example of a routing device according to an embodiment of the invention.

In this embodiment, an indexing server 60 stores, in a memory 61, parameters relating to the capability of a plurality of home gateways (not shown) of interoperability between a first and a second IP telephony service.

In this embodiment, a certain number of home gateways are able to communicate with the indexing server 60. In an alternative embodiment, which is not shown, each gateway is associated with an indexing server storing parameters relating to the interoperability capability of a plurality of home gateways. The home gateway and the associated server may even be disposed in the same casing.

Returning to FIG. 9, it suffices for the gateway 2 to interrogate the indexing server 60 so that the latter returns the address & HGW_2 of a home gateway 12 capable of providing interoperability. Gateway 2 then sends data in accordance with the first IP telephony service to the gateway 12 corresponding to this address and receives from that gateway 12 other data in accordance with the first service, as represented by the double arrow.

The transmission and receiving of data in accordance with the first service may be preceded by an exchange between the home gateway 2 and the home gateway 12. During this exchange, the gateway 2 requests gateway 12 to put it in contact with the recipient. For example, gateway 2 sends a message P comprising the address of the recipient, an identifier of the recipient's service, for example the second IP telephony service, and an interoperability request. The recipient's address may for example comprise a pseudonym. The present invention is not of course limited by such an implementation of the exchange. The message P may for example comprise only a universal address of the recipient and an interoperability request.

If the gateway 12 responds favorably, gateway 2 then sends data in accordance with the first IP telephony service. Gateway 12 then uses APIs corresponding to the two services concerned in order to achieve interoperability. The home gateway 12 therefore acts as an intermediary between the user of one service and the user of the other service. This function may be limited to signaling, that is to say the gateway 12 is restricted to transmitting the data, or it may also comprise a processing of the exchanged data, that is to say the data in accordance with the first service is processed in order to comply with the requirements of the second service and vice-versa. The processing may for example comprise a change of protocol, or even a transcoding.

The embodiments illustrated in FIGS. 7, 8 and 9 show only non-limiting possibilities of implementation of the routing.

In particular, the exchanged data may pass through several intermediaries.

The invention claimed is:

1. A home gateway device intended for a decentralized client equipment, a network address being allocated to the home gateway device, the home gateway device being located at the client end and comprising:
   receiving means for receiving a request for at least one address of a home gateway device able to convert data in order to provide interoperability between two given distinct IP telephony services,
   data conversion means for providing interoperability between two distinct IP telephony services, and
   sending means for sending a response to the request, said response comprising the network address allocated to the home gateway device, the response being sent only if the data conversion means is able to provide interoperability between the two given distinct IP telephony services indicated in the request.

2. An interoperability method intended to be used by a first home gateway device of a client equipment, the first home gateway device being located at the client end, comprising:
   receiving from a second home gateway device data sent in accordance with a first IP telephony service, and receiving from a third home gateway device data sent in accordance with a second IP telephony service,
   converting the data received from the second home gateway device into data in accordance with the second IP telephony service, and converting the data received from the third home gateway device into data in accordance with the first IP telephony service,
   transmitting the data converted in accordance with the second IP telephony service to the third home gateway device, and transmitting the data converted in accordance with the first IP telephony service to the second home gateway device.

3. The interoperability method as claimed in claim 2, further comprising:
   receiving a request for at least one address of a gateway device able to convert data in order to provide interoperability between the first and second IP telephony services, and
   sending a response, said response comprising an address of the first home gateway device.

4. The interoperability method as claimed in claim 3, wherein the request is received from the second home gateway device.

5. The interoperability method as claimed in claim 3, wherein the request is received from a server device.

6. A home gateway device intended for a decentralized client equipment, a network address being allocated to the home gateway device, the home gateway device being located at the client end and comprising:
   a component configured to receive a request for at least one address of a home gateway device able to convert data in order to provide interoperability between two given distinct IP telephony services,
   a data conversion component configured to provide interoperability between two distinct IP telephony services, and
   a sending component configured to send a response to the request, said response comprising the network address allocated to the home gateway device, the response being sent only if the data conversion component is able to provide interoperability between the two given distinct IP telephony services indicated in the request.

* * * * *